US008149896B2

(12) United States Patent
Filipovic

(10) Patent No.: US 8,149,896 B2
(45) Date of Patent: Apr. 3, 2012

(54) SPUR SUPPRESSION FOR A RECEIVER IN A WIRELESS COMMUNICATION SYSTEM

(75) Inventor: Daniel F. Filipovic, Solana Beach, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 740 days.

(21) Appl. No.: 11/324,858

(22) Filed: Jan. 4, 2006

(65) Prior Publication Data

US 2007/0153878 A1 Jul. 5, 2007

(51) Int. Cl.
H04B 1/00 (2006.01)
(52) U.S. Cl. ............ 375/147; 375/346; 375/350
(58) Field of Classification Search ........ 375/147, 375/346–350
See application file for complete search history.

(56) References Cited

U.S. PATENT DOCUMENTS

| 5,226,057 | A |   | 7/1993  | Boren              |         |
|-----------|---|---|---------|--------------------|---------|
| 5,325,188 | A | * | 6/1994  | Scarpa             | 348/624 |
| 5,325,204 | A | * | 6/1994  | Scarpa             | 348/607 |
| 5,703,358 | A | * | 12/1997 | Hoekman et al.     | 250/282 |
| 5,758,275 | A | * | 5/1998  | Cox et al.         | 455/307 |
| 5,768,166 | A |   | 6/1998  | Palatnik           |         |
| 6,297,637 | B1| * | 10/2001 | Feld et al.        | 324/322 |
| 6,426,983 | B1|   | 7/2002  | Rakib et al.       |         |
| 6,976,044 | B1| * | 12/2005 | Kilani             | 708/320 |
| 2002/0087199 | A1 |  | 7/2002 | Bange et al.       |         |
| 2004/0199082 | A1 |  | 10/2004| Ostroff et al.     |         |
| 2004/0223085 | A1 | * | 11/2004| Kwak              | 348/607 |
| 2005/0047486 | A1 |  | 3/2005 | Sakaue et al.      |         |
| 2005/0226356 | A1 | * | 10/2005| Pirzada et al.    | 375/350 |
| 2006/0093019 | A1 | * | 5/2006 | Gaikwad et al.    | 375/139 |

FOREIGN PATENT DOCUMENTS

| CN | 1551514 A    | 12/2004 |
|----|--------------|---------|
| EP | 0987829      | 3/2000  |
| JP | 2000101479 A | 4/2000  |
| JP | 2004336715 A | 11/2004 |
| JP | 2005117365 A | 4/2005  |

OTHER PUBLICATIONS

International Search Report—PCT/US07/060121, International Search Authority—European Patent Office—Oct. 25, 2007.
Written Opinion—PCT/US2007/060121—ISA/EPO—Oct. 25, 2007.

* cited by examiner

*Primary Examiner* — Curtis Odom
(74) *Attorney, Agent, or Firm* — Howard Seo; Ramin Mobarhan

(57) ABSTRACT

Techniques for suppressing spurs in a receiver are described. A processor (e.g., within a wireless device) receives digital samples for a desired signal having a spur located within the bandwidth of the desired signal. A spur is an undesired signal that may be generated internally at the receiver or may come from an external interfering source. The processor filters the digital samples to suppress the spur and provides output samples having the spur suppressed. The processor may detect for the spur, e.g., by performing an FFT on the digital samples and examining the spectral response. The processor may filter the digital samples with a notch filter having an adjustable notch frequency and/or an adjustable notch bandwidth. For example, the notch frequency may be set based on the frequency of the spur, and the notch bandwidth may be set based on the amplitude of the spur.

24 Claims, 6 Drawing Sheets

SPUR SUPPRESSION FOR A RECEIVER IN A WIRELESS COMMUNICATION SYSTEM

BACKGROUND

I. Field

The present disclosure relates generally to communication, and more specifically to techniques for processing a signal at a receiver in a wireless communication system.

II. Background

In a wireless communication system, a transmitter modulates data onto a radio frequency (RF) carrier signal and generates an RF modulated signal that is more suitable for transmission. The transmitter then transmits the RF modulated signal via a wireless channel to a receiver. The receiver receives the transmitted signal, filters and amplifies the received signal, frequency downconverts the amplified signal from RF to baseband, and digitizes the baseband signal to obtain samples. The receiver then processes the samples to recover the data sent by the transmitter.

A receiver typically generates various undesired signals, which are often called spurs. For example, the spurs may be harmonics of a reference oscillator for the receiver, harmonics of a sampling clock used to digitize the baseband signal, harmonics of clocks used for digital circuits at the receiver, mixing products of RF components, and so on. Some of the spurs may fall within the bandwidth of the desired signal. These in-band spurs act as noise that hinders the receiver's ability to properly demodulate the received signal and hence desenses the receiver. In fact, it is not uncommon for a receiver to have one or more "bad" frequency channels in which the receiver exhibits poor sensitivity due to spurs. The poor sensitivity may result in poor performance, reduced communication coverage, and possibly other deleterious effects, all of which are undesirable.

There is therefore a need in the art for techniques to mitigate the deleterious effects of spurs in a receiver.

SUMMARY

Techniques for suppressing spurs in a receiver are described herein. In general, a spur is an undesired signal that may be generated internally at the receiver or may come from an external interfering source. The techniques may be used for a wireless device as well as a base station in a wireless communication system. The techniques can improve sensitivity and performance for some frequency channels by suppressing spurs while removing only a small portion of a desired signal.

In an embodiment, a processor (e.g., within a wireless device) receives digital samples for a desired signal having a spur located within the bandwidth of the desired signal. The processor filters the digital samples to suppress the spur and provides output samples having the spur suppressed. The processor may detect for the spur, e.g., by performing a fast Fourier transform (FFT) or a discrete Fourier transform (DFT) on the digital samples and examining the resultant spectral response. The spur may also be one of a number of spurs known to be generated internally at the receiver. The processor may filter the digital samples with a notch filter having an adjustable notch frequency and/or an adjustable notch bandwidth. For example, the notch frequency may be set based on the frequency of the spur, and the notch bandwidth may be set based on the amplitude of the spur.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The spur suppression techniques described herein may be used for various wireless communication systems such as a code division multiple access (CDMA) system, a time division multiple access (TDMA) system, a frequency division multiple access (FDMA) system, an orthogonal frequency division multiple access (OFDMA) system, an orthogonal frequency division multiplexing (OFDM) system, a single-carrier frequency division multiple access (SC-FDMA) system, and so on. A CDMA system may implement one or more radio access technologies such as cdma2000, Wideband-CDMA (W-CDMA), and so on. cdma2000 covers IS-95, IS-2000, and IS-856 standards. A TDMA system may implement Global System for Mobile Communications (GSM). GSM and W-CDMA are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. An OFDMA system utilizes OFDM. An OFDM-based system transmits modulation symbols in the frequency domain whereas an SC-FDMA system transmits modulation symbols in the time domain. In general, the techniques described herein may be used for any communication system in which a spur to be suppressed occupies only a portion of the desired signal bandwidth. The techniques are especially applicable for wideband communication systems such as, e.g., CDMA and OFDM-based systems.

The spur suppression techniques may be used for a wireless device as well as a base station in a wireless communication system. A base station is generally a fixed station that communicates with the wireless devices and may also be called a base transceiver system (BTS), a Node B, an access point, or some other terminology. A wireless device may be fixed or mobile and may also be called a mobile station, a user equipment, a terminal, a subscriber unit, or some other terminology. A wireless device may be a cellular phone, a personal digital assistant (PDA), a wireless modem card, and so on. For clarity, much of the description below is for a wireless device in a CDMA system, which may implement cdma2000 or W-CDMA.

Figure 1:
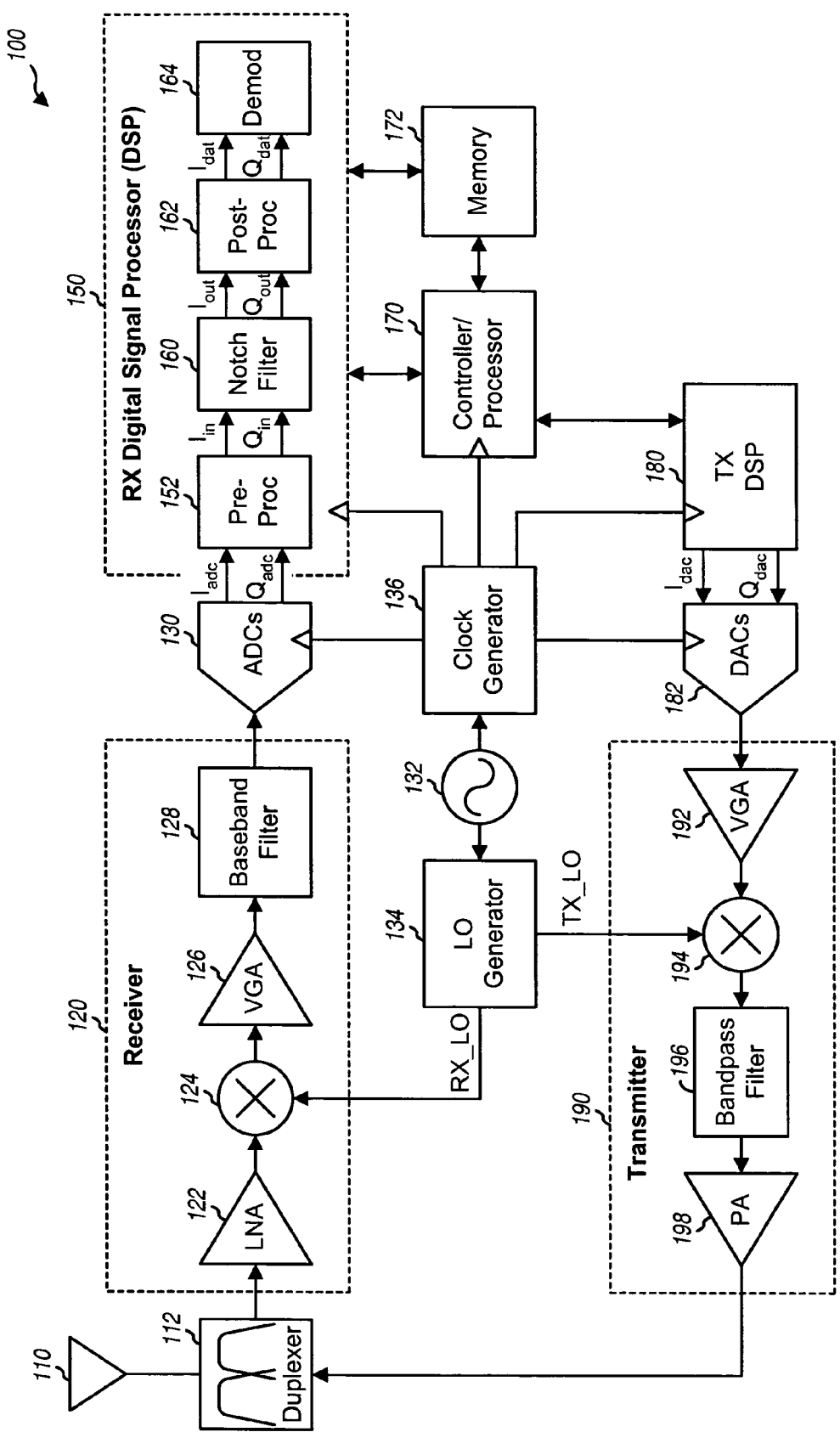
FIG. 1 shows a block diagram of a wireless device.

FIG. 1 shows a block diagram of a wireless device 100 in a CDMA system. On the receive path, an antenna 110 receives one or more RF modulated signals from one or more base stations and possibly interfering signals from other transmitters. Antenna 110 provides a received RF signal to a duplexer 112. Duplexer 112 filters the received RF signal for a desired forward link (or downlink) frequency band and provides an input RF signal to a receiver 120. The desired frequency band may be the cellular band, the PCS band, or some other frequency band.

In general, a receiver may implement a super-heterodyne architecture or a direct-to-baseband architecture. In the super-heterodyne architecture, the input RF signal is frequency downconverted in multiple stages, e.g., from RF to an intermediate frequency (IF) in one stage, and then from IF to baseband in another stage. In the direct-to-baseband architecture, the input RF signal is frequency downconverted from RF directly to baseband in one stage. The super-heterodyne and direct-to-baseband architectures may use different circuit blocks and/or have different circuit requirements. The following description is for the direct-to-baseband architecture.

Within receiver 120, a low noise amplifier (LNA) 122 receives and amplifies the input RF signal with a fixed or variable gain and provides an amplified RF signal. A mixer 124 frequency downconverts the amplified RF signal with a receive local oscillator (RX_LO) signal from an LO generator 134 and provides a downconverted signal. The frequency of the RX_LO signal may be selected such that the RF modulated signal for a desired CDMA channel is downconverted to baseband or near-baseband. A variable gain amplifier (VGA) 126 amplifies the downconverted signal with a variable gain and provides an input baseband signal having the desired amplitude. LNA 122, VGA 126, and other circuit blocks within a receive (RX) digital signal processor (DSP) 150 provide the required signal amplification for the input RF signal, which may vary by 90 decibels (dB) or more in amplitude.

A baseband filter 128 filters the input baseband signal and provides an output baseband signal. Although not shown in FIG. 1 for simplicity, the signals from LO generator 134, mixer 124, VGA 126, and filter 128 are complex signals, with each complex signal having an inphase (I) component and a quadrature (Q) component. Analog-to-digital converters (ADCs) 130 digitize the output baseband signal and provide I and Q ADC samples, $I_{adc}$ and $Q_{adc}$. ADCs 130 may digitize at baseband (as shown in FIG. 1) or at an intermediate frequency for IF sampling (not shown in FIG. 1). ADCs 130 may be implemented with delta-sigma ADCs (ΔΣ ADCs), flash ADCs, or some other types of ADCs. A ΔΣ ADC can digitize an input signal with few bits of resolution but at a sampling rate that is many times greater than the bandwidth of the signal.

Within RX DSP 150, a pre-processor (pre-proc) 152 performs pre-processing (e.g., digital filtering, sample rate conversion, interpolation, and so on) on the I and Q ADC samples and provides I and Q input samples, $I_{in}$ and $Q_{in}$. As a specific example, ADCs 130 may be ΔΣ ADCs that can digitize the output baseband signal with four bits of resolution at 32 times chip rate (or chipx32) for cdma2000. The chip rate is 1.2288 megachips/second (Mcps) for cdma2000 and 3.84 Mcps for W-CDMA. Pre-processor 152 may filter the ADC samples and perform sample rate conversion to obtain input samples with 18 bits of resolution at chip rate (or chipx1). The input sample rate may thus be different from the ADC sample rate.

A notch filter 160 processes the I and Q input samples to suppress spurs, as described below, and provides I and Q output samples, $I_{out}$ and $Q_{out}$. A post-processor (post-proc) 162 performs post-processing on the I and Q output samples and provides I and Q data samples, $I_{dat}$ and $Q_{dat}$. For example, post-processor 162 may perform automatic gain control (AGC), digital filtering, direct current (DC) removal, and so on. A demodulator (Demod) 164 performs demodulation on the I and Q data samples and provides demodulated data. Demodulator 164 may implement a rake receiver or some other type of receiver, as is known in the art.

On the transmit path, a transmit (TX) DSP 180 processes data to be transmitted and provides I and Q data chips, $I_{dac}$ and $Q_{dac}$. Digital-to-analog converters (DACs) 182 convert the I and Q data chips to analog and provides a complex analog signal to a transmitter 190. Within transmitter 190, a VGA 192 amplifies the analog signal with a variable gain. A mixer 194 frequency upconverts the amplified signal from baseband to RF with a transmit LO (TX_LO) signal from LO generator 134. A bandpass filter 196 filters the upconverted signal to remove images caused by the digital-to-analog conversion and the frequency upconversion. A power amplifier (PA) 198 amplifies the upconverted signal and provides an output RF signal having the required power level. Duplexer 112 filters the output RF signal for a reverse link (or uplink) frequency band and provides a filtered output RF signal for transmission via antenna 110. Although not shown in FIG. 1 for simplicity, the signals from DAC 182 and VGA 192 are complex signals having I and Q components.

A reference oscillator 132 provides a reference signal having a precise frequency. Reference oscillator 132 may be a crystal oscillator (XO), a temperature compensated crystal oscillator (TCXO), a voltage controlled oscillator (VCO), or some other type of oscillator. LO generator 134 generates the RX_LO and TX_LO signals based on the reference signal from oscillator 132. A clock generator 136 generates clocks for various units within wireless device 100 based on the reference signal. For example, clock generator 136 may generate a sampling clock at 32 times chip rate (chipx32) for ADCs 130 and a digital clock at 16 times chip rate (chipx16) for DSPs 150 and 180 and a controller 170.

Controller 170 controls the operation of DSPs 150 and 180 and other circuit blocks within wireless device 100. For example, controller 170 may detect for spurs and control the operation of notch filter 160 based on the detected spurs. A memory 172 stores data and program codes for various processing units (e.g., RX DSP 150 and controller 170) within wireless device 100.

FIG. 1 shows a specific design for the receiver and transmitter. In general, the signal conditioning for each path may be performed by one or more stages of amplifier, filter, mixer, and so on. The receiver and transmitter may include different and/or additional circuit blocks not shown in FIG. 1.

FIG. 1 also shows a specific design of RX DSP 150. In general, the digital processing may be performed in various manners. For example, notch filter 160 may be located after ADC 130, after pre-processor 152 (as shown in FIG. 1), or after post-processor 162.

Figure 2A:
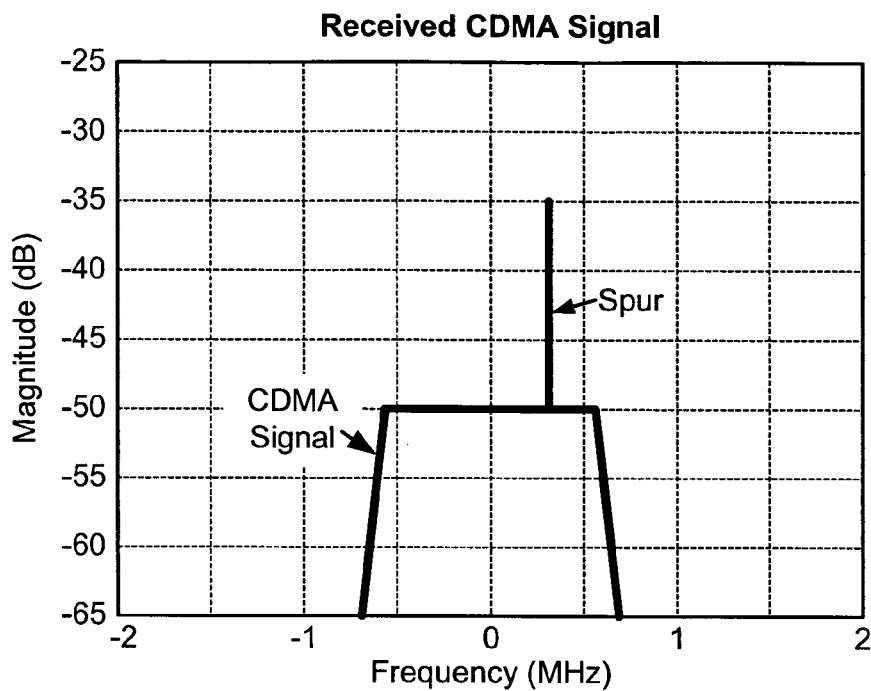
FIG. 2A shows a spectral plot of a CDMA signal.

FIG. 2A shows a spectral plot of an exemplary CDMA signal within receiver 120 in FIG. 1. For cdma2000, a base station spectrally spreads data with a pseudo-random number (PN) sequence at a chip rate of 1.2288 Mcps. The resulting spread spectrum signal has a two-sided bandwidth of 1.23 megaHertz (MHz) and is frequency upconverted to a specific CDMA channel in a specific frequency band. For the forward link, the cellular band spans from 869 to 894 MHz, and the PCS band spans from 1930 to 1990 MHz. Each frequency band covers many CDMA channels, and each CDMA channel has a bandwidth of 1.23 MHz.

Wireless device 100 may generate various spurs that appear within the bandwidth of a received CDMA signal. For example, reference oscillator 132 may operate at 19.2 MHz, and clock generator 136 may generate various clocks based on the 19.2 MHz reference clock from oscillator 132. These clocks may have strong harmonics of 19.2 MHz that fall within a frequency band of interest. For example, the $46^{th}$ harmonic of 19.2 MHz is at 883.2 MHz, and the spur for the $46^{th}$ harmonic falls within the cellular band and may be strong relative to the received CDMA signal, as shown in FIG. 2A.

Spurs may also be generated by mixing products of RF components. For example, the $19^{th}$ harmonic of the 19.2 MHz reference clock may mix with the $13^{th}$ harmonic of chipx32 to generate a spur at 875.98 MHz, which falls within the cellular band. LO generator 134 may generate one or more LO signals for frequency downconversion within receiver 120 and one or more LO signals for frequency upconversion within transmitter 190. The LO signals may mix together and/or with other clocks within wireless device 100 to generate spurs that fall within the frequency band of interest.

Spurs may also be generated by mixing products of undesired components (which are also called jammers) in the received signal. For example, IS-98D, which is applicable to cdma2000, specifies a single-tone test and a two-tone test that are intended to test the linearity and dynamic range of the receive path in a wireless device. For the single-tone test, a single tone is located at +900 KHz from the center frequency of the CDMA signal and is 71 dB higher in amplitude than the CDMA signal level, which is at −101 dBm for this test. Non-linearity in the receive path causes the tone to mix with the CDMA signal and generate intermodulation components that fall within the CDMA signal bandwidth. For the two-tone test, two tones are located at +900 KHz and +1700 KHz from the center frequency of the CDMA signal and are 58 dB higher in amplitude than the CDMA signal level. Non-linearity in the receive path causes these two tones to mix together and generate a spur at +100 KHz.

In general, spurs may be generated internally within wireless device 100 by various mechanisms. Internally generated spurs are likely to become more prevalent and more problematic as more functions (e.g., RF and digital) are integrated within a single integrated circuit (IC) die or multiple IC dies are encapsulated within a single package. Spurs may also come from external interfering sources and may appear in the received RF signal from antenna 110. Internally generated spurs are typically tones at deterministic frequencies whereas external spurs may be narrowband signals at random frequencies. In any case, the spurs desense the receiver for each CDMA channel affected by these spurs.

Figure 2B:
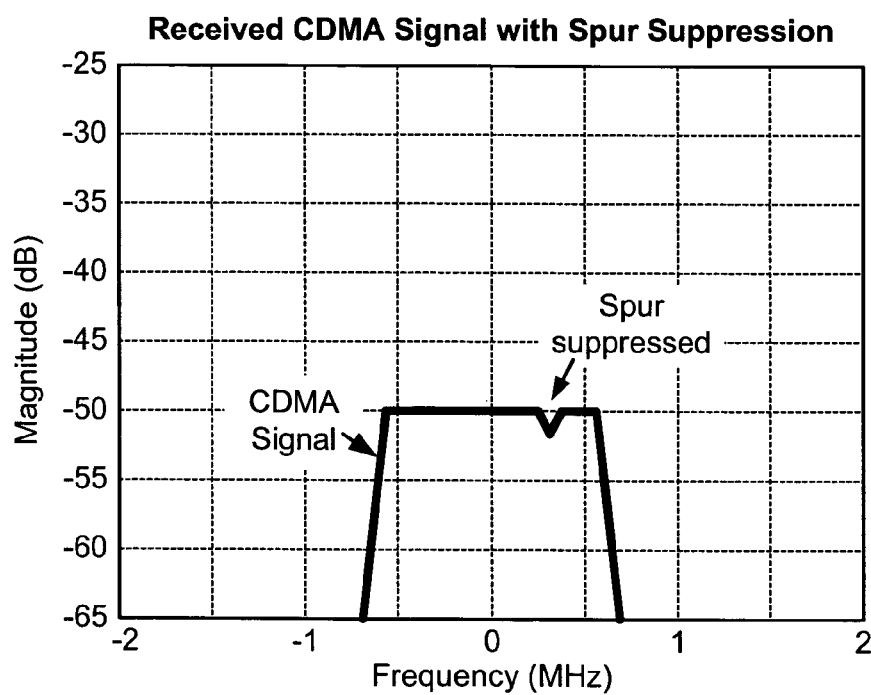
FIG. 2B shows a spectral plot of the CDMA signal with spur suppression.

FIG. 2B shows a spectral plot of the exemplary CDMA signal after spur suppression with a notch filter. Internally generated spurs are often narrowband sinusoidal signals that are both deterministic and track in frequency with drifts in reference oscillator 132. For example, the harmonics of the reference clock are determined by the frequency of reference oscillator 132. Hence, a spur within a CDMA channel may be suppressed with an appropriately placed notch filter. By suppressing the spur while removing only a small portion of the desired CDMA signal, higher sensitivity and improved performance may be achieved for the CDMA channel.

Figure 3:
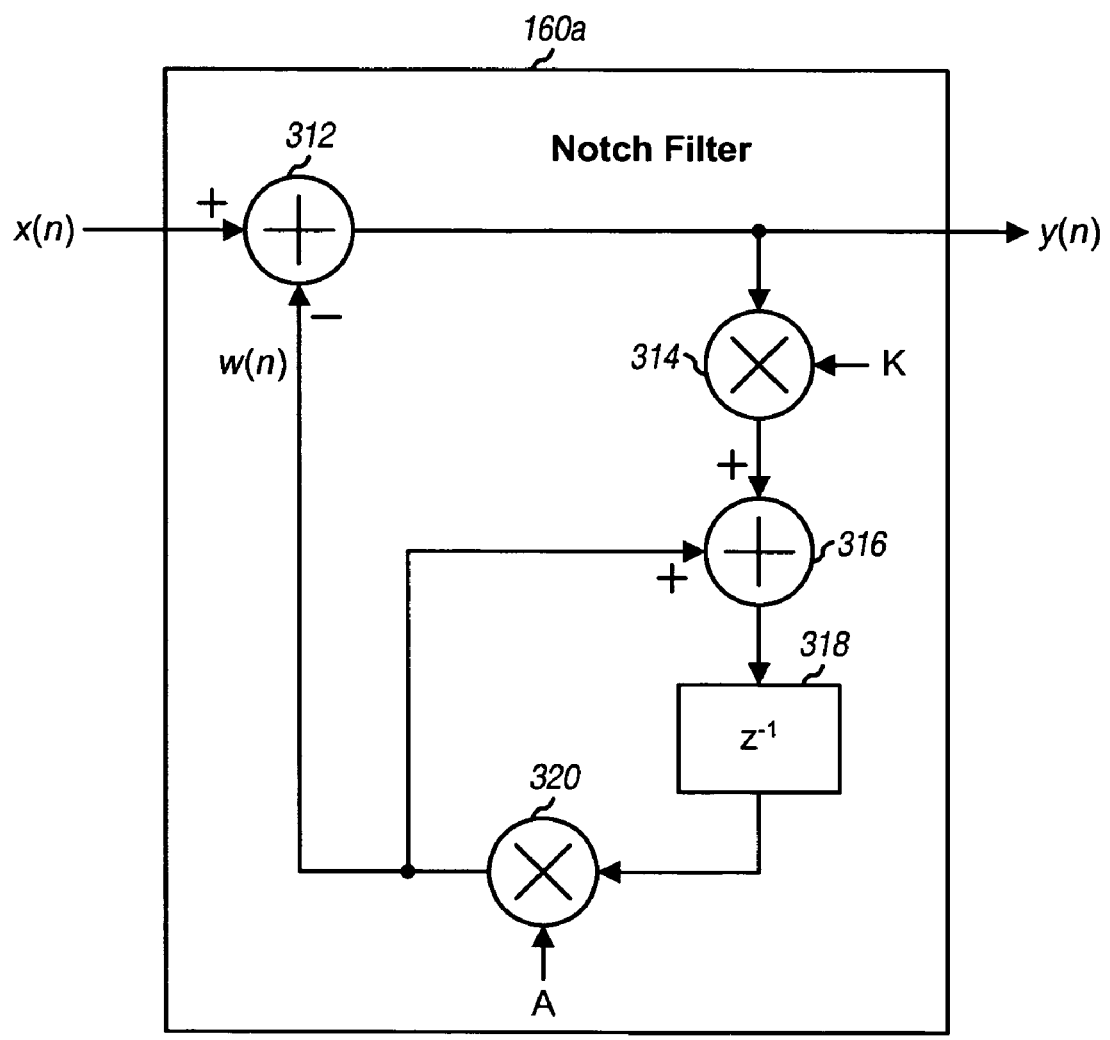
FIG. 3 shows a block diagram of a notch filter used for spur suppression.

FIG. 3 shows a block diagram of a notch filter 160a, which is an embodiment of notch filter 160 in FIG. 1. In FIG. 3, x(n) represents a complex input sample from pre-processor 152 for sample period n, y(n) represents a complex output sample provided by notch filter 160a for sample period n, and w(n) represents a complex intermediate sample within notch filter 160a for sample period n, where $$x(n) = I_{in}(n) + jQ_{in}(n), \text{ and} \qquad \text{Eq (1)}$$

$$y(n) = I_{out}(n) + jQ_{out}(n).$$

Within notch filter 160a, an adder 312 receives and subtracts the intermediate sample w(n) from the input sample x(n) and provides the output sample y(n). A multiplier 314 multiplies the output sample with a gain K. An adder 316 adds the intermediate sample and the output of multiplier 314. A register 318 stores the output of summer 316 and provides a delay of one sample period. A multiplier 320 multiplies the stored sample from register 318 with a gain A and provides the intermediate sample.

Notch filter 160a includes a loop formed by adder 316, register 318, and multiplier 320. Multiplier 320 introduces a phase rotation on the stored sample from register 318, with the amount of phase rotation being determined by the gain A. Adder 316 and register 318 form an accumulator that accumulates on itself. This self-accumulation introduces a sinusoidal component having a frequency determined by the amount of phase rotation for each accumulation and the rate of accumulation. The sinusoidal component models the spur to be suppressed and is subtracted from the input sample.

The intermediate sample may be expressed as:

$$w(n) = A \cdot [w(n-1) + K \cdot y(n-1)], \qquad \text{Eq (2)}$$

$$W(z) = A \cdot [W(z) \cdot z^{-1} + K \cdot Y(z) \cdot z^{-1}], \text{ and} \qquad \text{Eq (3)}$$

$$W(z) = \frac{A \cdot K \cdot Y(z) \cdot z^{-1}}{1 - A \cdot z^{-1}} = \frac{A \cdot K \cdot Y(z)}{z - A}. \qquad \text{Eq (4)}$$

Equation (2) is for discrete time n, and equations (3) and (4) are for the z-domain.

A transfer function H(z) for the output sample may be expressed as:

$$y(n) = x(n) - w(n), \qquad \text{Eq (5)}$$

$$Y(z) = X(z) - W(z) = X(z) - \frac{A \cdot K \cdot Y(z)}{z - A}, \text{ and} \qquad \text{Eq (6)}$$

$$H(z) = \frac{Y(z)}{X(z)} = \frac{z - A}{z - A \cdot (1 - K)}. \qquad \text{Eq (7)}$$

As shown in equation (7), the transfer function H(z) includes a single zero determined by the gain A and a single pole determined by the gains K and A. The gains K and A may be defined as:

$$K \ll 1, \text{ and} \qquad \text{Eq (8)}$$

$$A = e^{j2\pi \cdot M}, \qquad \text{Eq (9)}$$

where $0 \leq M \leq 1$.

Figure 4A:
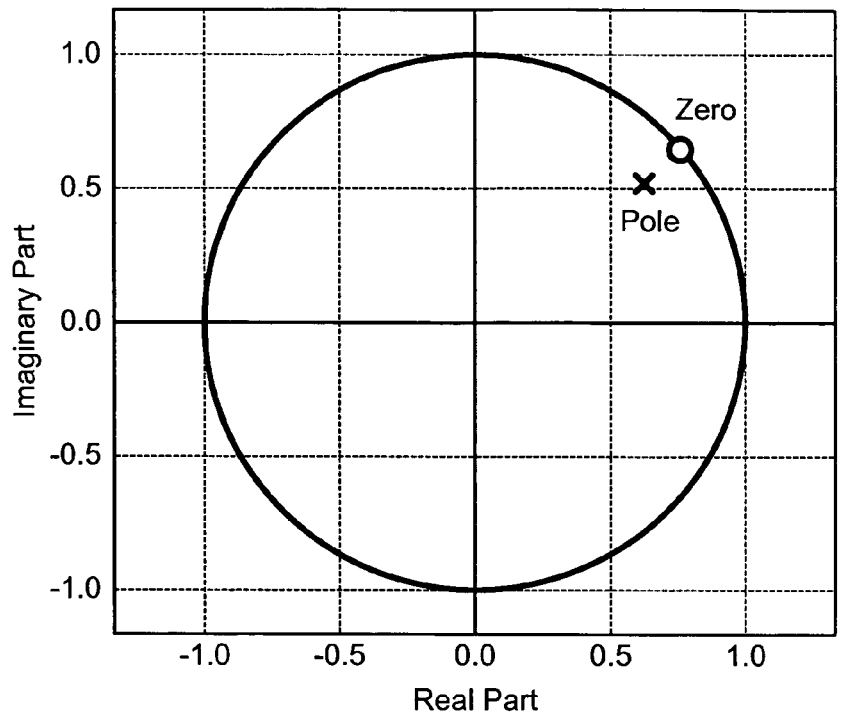
FIG. 4A shows a plot of the pole and zero for the notch filter.

FIG. 4A shows a plot of the pole and zero for transfer function H(z) in equation (7). The zero may be placed on a unit circle by defining the gain A to have the form shown in equation (9). The quantity M determines the location of the zero on the unit circle. The frequency response of notch filter 160a has a notch due to the zero. The center frequency of this notch is determined by the location of the zero and may be given as:

$$f_{notch} = f_s \cdot M \qquad \text{Eq (10)}$$

where $f_s$ is the sample rate for the notch filter and $f_{notch}$ is the notch frequency. Since A is a complex value, the notch appears on only one side in frequency. The gain K determines the bandwidth of the notch and is typically much less than one, as shown in equation (8).

Figure 4B:
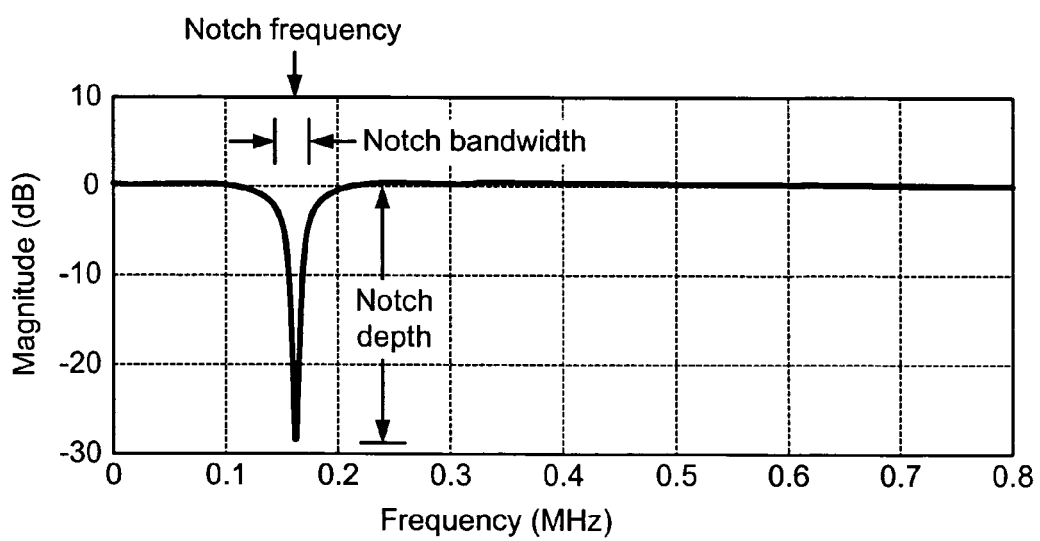
FIG. 4B shows a frequency response of the notch filter.

FIG. 4B shows an exemplary frequency response of notch filter 160a. For this example, the sample rate is 4/3 times the chip rated $f_c$, K=0.125, A=$e^{j\pi/5}$, and the notch frequency is 0.164 MHz.

The width of the notch is determined by the gain K, with a larger gain K corresponding to a wider notch, and vice versa. The width of the notch is also related to the depth of the notch, with a wider notch corresponding to a deeper notch, and vice versa. A spur may be captured more easily with a wider notch, which can also suppress the spur more due to the deeper notch. However, a wider notch also attenuates more desired signal component. Conversely, it may be more difficult to capture a spur with a narrow notch, which can suppress the spur less due to a more shallow notch. The width of the notch may be a variable parameter and may be adjusted based on the characteristics of the spur being suppressed, as described below.

Notch filter 160a typically operates at the rate of the input samples, which is called the sample rate. In general, it is desirable to operate notch filter 160a at a rate that is as low as possible in order to achieve several benefits. First, for a given number of bits used to represent the gain A, the resolution of the notch frequency is proportional to the sample rate. Hence, finer resolution may be achieved for the notch frequency with a lower sample rate. Second, since power consumption is proportional to clock rate for CMOS digital circuits, a low sample rate reduces power consumption. The sample rate should be greater than chip rate in order to avoid aliasing. In an embodiment, the sample rate is select to be 4/3 times the chip rate, or $f_s$=1.333×$f_c$. For cdma2000, the sample rate is 1.638 MHz for a chip rate of 1.2288 Mcps.

Figure 5A:
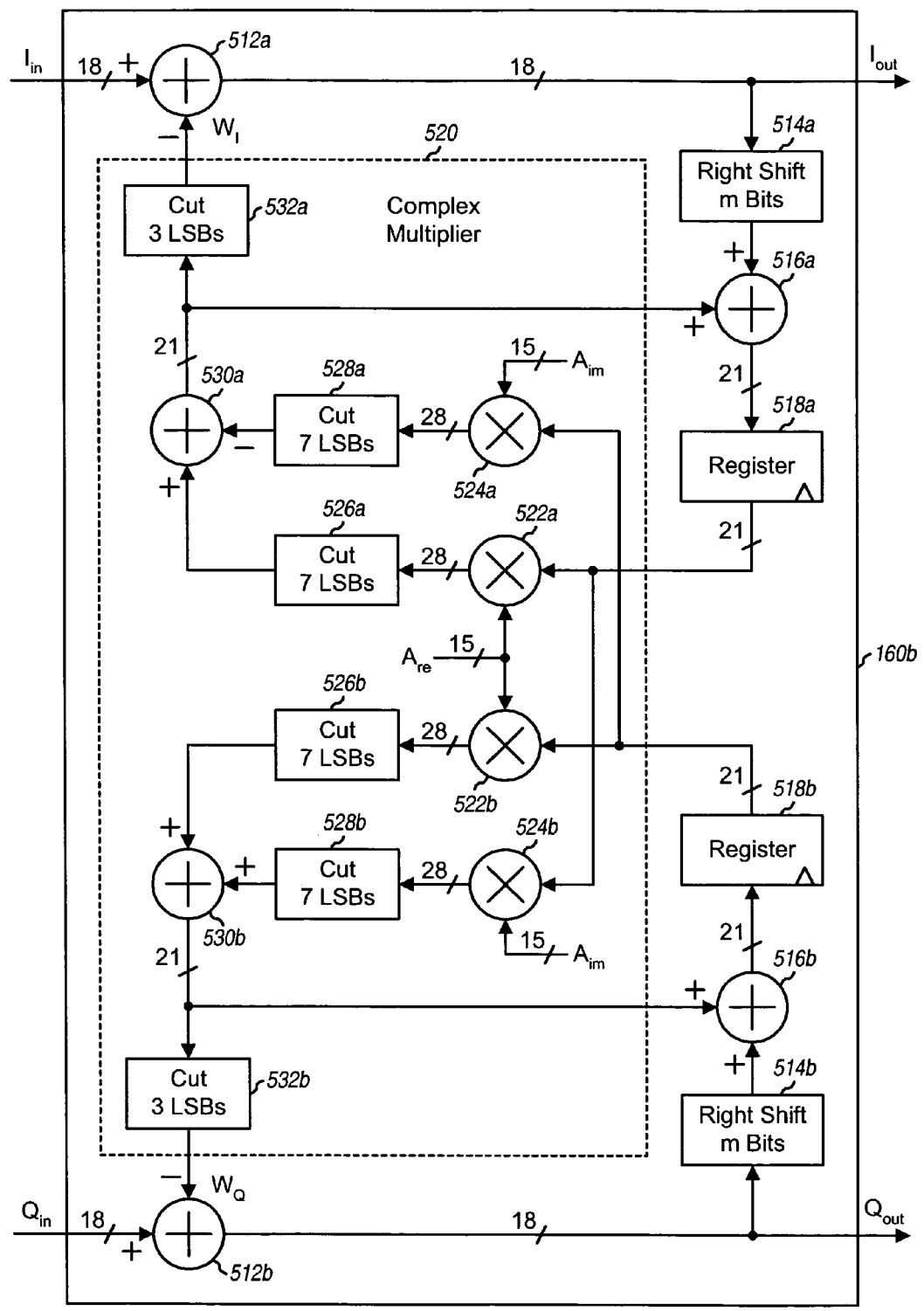
FIGS. 5A and 5B show an embodiment of the notch filter.

FIG. 5A shows a block diagram of a notch filter 160b, which is a specific embodiment of notch filter 160a in FIG. 3. For this embodiment, the input and output samples are assumed to have 18 bits of resolution. Notch filter 160b includes an I path that processes the I input sample $I_{in}$ and a Q path that processes the Q input sample $Q_{in}$. The input and output samples as well as all quantities within notch filter 160b are represented with signed integer numbers. A k-bit signed number includes one sign bit and k-1 data bits.

For the I path, a saturating adder 512a receives and subtracts an I intermediate sample $W_I$ from the I input sample $I_{in}$ and provides an I output sample $I_{out}$. A shift unit 514a shifts the I output sample to the right by m bits. A saturating adder 516a adds the output of a saturating adder 530a and the shifted sample from unit 514a. A register 518a stores the output of adder 516a and provides a delay of one sample period.

For the Q path, a saturating adder 512b receives and subtracts a Q intermediate sample $W_Q$ from the Q input sample $Q_{in}$ and provides a Q output sample $Q_{out}$. A shift unit 514b shifts the Q output sample to the right by m bits. A saturating adder 516b adds the output of a saturating adder 530b and the shifted sample from unit 514b. A register 518b stores the output of adder 516b and provides a delay of one sample period.

A complex multiplier 520 performs a complex multiply of the complex output of registers 518a and 518b with the complex gain A=$A_{re}$+j $A_{im}$ and provides a complex intermediate sample W=$W_I$+j $W_Q$. Multiplier 520 performs a complex multiply using four real multiplies and bit manipulation to obtain the desired output.

For the I path within complex multiplier 520, a real multiplier 522a multiplies the output of register 518a with the gain $A_{re}$, and a real multiplier 524a multiplies the output of register 518b with the gain $A_{im}$. A unit 526a cuts 7 least significant bits (LSBs) of the output of multiplier 522a, and a unit 528a cuts 7 LSBs of the output of multiplier 524a. A "cut" operation may include truncation, rounding, and/or some other operation. Saturating adder 530a subtracts the output of unit 528a from the output of unit 526a. A unit 532a cuts 3 LSBs of the output of adder 530a and provides the I intermediate sample $W_I$.

For the Q path within complex multiplier 520, a real multiplier 522b multiplies the output of register 518b with the gain $A_{re}$, and a real multiplier 524b multiplies the output of register 518a with the gain $A_{im}$. A unit 526b cuts 7 LSBs of the output of multiplier 522b, and a unit 528b cuts 7 LSBs of the output of multiplier 524b. Saturating adder 530b adds the output of unit 528b and the output of unit 528b. A unit 532b cuts 3 LSBs of the output of adder 530b and provides the Q intermediate sample $W_Q$.

Figure 5B:
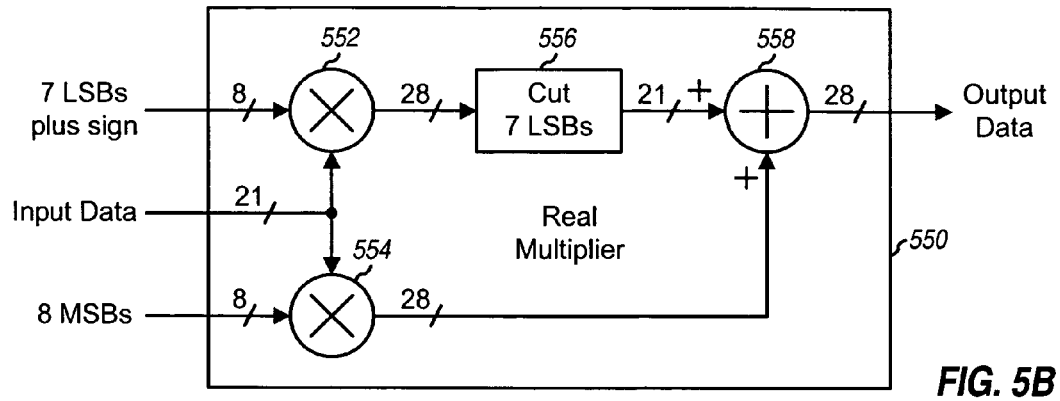

FIG. 5B shows an embodiment of a real multiplier 550, which may be used for each of real multipliers 522a, 522b, 524a and 524b in FIG. 5A. Multiplier 550 receives and multiplies a 15-bit gain with 21-bit input data and provides 28-bit output data. The 21-bit input data may be from register 518a or 518b in FIG. 5A. The 28-bit output data may be for unit 526a, 526b, 528a or 528b. The 15-bit gain may be $A_{re}$ or $A_{im}$ and is partitioned into two coefficients. The first coefficient contains the 7 LSBs of the 15-bit gain plus a sign bit. The second coefficient contains the 8 MSBs of the 15-bit gain, which already includes the sign bit.

Within multiplier 550, a multiplier 552 receives and multiplies the 21-bit input data with the first coefficient and provides a 28-bit output. A multiplier 554 receives and multiplies the 21-bit input data with the second coefficient and provides a 28-bit output. A unit 556 cuts 7 LSBs of the 28-bit output from multiplier 552 and provides a 21-bit output that is properly aligned with the 28-bit output from multiplier 554. A saturating adder 558 adds the 21-bit output of unit 556 and the 28-bit output of multiplier 554 and provides the 28-bit output data.

For the embodiment shown in FIGS. 5A and 5B, a complex multiply by A is effectively implemented with eight smaller (21 bits by 8 bits) real multiplies. These eight real multiplies may be implemented with a single hardware unit that performs the real multiplies in a time division multiplexed (TDM) manner. A multiply by K is implemented with bit shift units 514a and 514b. The gain K is then equal to a power of two, or K=$2^{-m}$, where m is the number of right bit shifts for each output sample and may be set to one or greater. The frequency response of notch filter 160b may be easily adjusted by shifting different numbers of bits.

FIGS. 5A and 5B show a specific embodiment of notch filter 160b. Specific bit-widths are given at various nodes throughout the notch filter. The number of bits at each node may be selected based on various performance criteria, as described below.

A loop is formed by multiplier 520, adders 516, and registers 518. This loop may be designed with a sufficient number of additional bits so that quantization impact is negligible at sensitivity. Sensitivity refers to the lowest CDMA signal level that the wireless device is required to correctly demodulate. The number of additional bits is equal to the difference between the bit-width of registers 518 and the bit-width of the input and output samples. Computer simulation indicates that one additional bit may be sufficient to achieve negligible quantization impact. For the exemplary design shown in FIGS. 5A and 5B, three additional bits are used for the loop to achieve extra margin.

The bit-width for the gains $A_{re}$ and $A_{im}$ determines the accuracy and stability of the notch frequency. If an insufficient number of bits is used for $A_{re}$ and $A_{im}$, then the notch frequency may dither around a center frequency, and it may be difficult to capture and suppress a spur. For the exemplary design shown in FIGS. 5A and 5B, computer simulation indicates that 15 bits (or 14-bit signed numbers) are sufficient for $A_{re}$ and $A_{im}$ to ensure a stable and accurate notch frequency. With 14-bit signed numbers for $A_{re}$ and $A_{im}$, the notch frequency has a resolution of $f_s/2^{14}$, which is equal to 100 Hz for a sample rate of $f_s=1.333 \times f_c=1.638$ Mcps. This resolution should be adequate since the bandwidth of the notch is typically much wider than 100 Hz.

For the exemplary design shown in FIGS. 5A and 5B, the gains $A_{re}$ or $A_{im}$ may be determined as follows:

$$M = f_{notch}/f_s, \quad \text{Eq (11)}$$

$$A = 2^{14} \cdot e^{j\pi \cdot M}, \quad \text{Eq (12)}$$

$$A_{re} = \text{real}(A), \text{ and} \quad \text{Eq (13)}$$

$$A_{im} = \text{imag}(A). \quad \text{Eq (14)}$$

The number of right bit shifts by units 514 determines the value of the gain K and hence determines the bandwidth of the notch filter. A few (e.g., one) right bit shifts correspond to a larger gain value and a wider and deeper notch, which provides more spur suppression but also attenuates more desired signal component. More right bit shifts correspond to a smaller gain value and a more narrow and shallow notch, which provides less spur suppression but also attenuates less desired signal component. The number of right bit shifts may be variable and selected based on the detected spur, e.g., fewer right bit shifts for a larger spur. In an embodiment, the amount of spur suppression is determined (e.g., based on computer simulation and/or empirical measurement) for each different number of right bit shifts (e.g., for m=1, 2, 3, 4, ...) and stored in a look-up table. An appropriate number of right bit shifts may then be selected based on the amplitude of a detected spur.

The spur detection and suppression may be performed in various manners. In an embodiment, a fast Fourier transform (FFT) is performed on the samples from ADCs 130 or preprocessor 152 to determine the spectral characteristics of the samples. Spurs within the desired signal bandwidth are identified based on the FFT output. The locations of these spurs may also be determined based on the FFT output. The notch filter may be moved to the location of the largest spur, and the width of the notch may be set based on the amplitude of the largest spur relative to the desired signal level.

In another embodiment, spurs that are generated internally by a wireless device are identified, e.g., based on empirical measurements, computer simulation, and so on. For example, spurs for different harmonics of the clocks within the wireless device, spurs for different mixing products, and so on, may be ascertained. These spurs may be stored in a look-up table. Alternatively, the values for the gains K and A that can provide good suppression of these spurs may be ascertained and stored in the look-up table. The wireless device may attempt to suppress different spurs stored in the look-up table, e.g., by applying different gain values from the look-up table. For each spur stored in the look-up table, the performance with that spur suppressed may be ascertained. The suppressed spur that results in the best performance may be retained. Performance may be quantified by various metrics such as, e.g., lower bit error rate or frame error rate, better spectral response from the FFT output, and so on.

In yet another embodiment, a wireless device searches for a spur by sweeping the notch filter across the desired signal bandwidth. The wireless device may stop at a notch frequency that provides good performance. The spur detection and suppression may also be performed in other manners.

Figure 6:
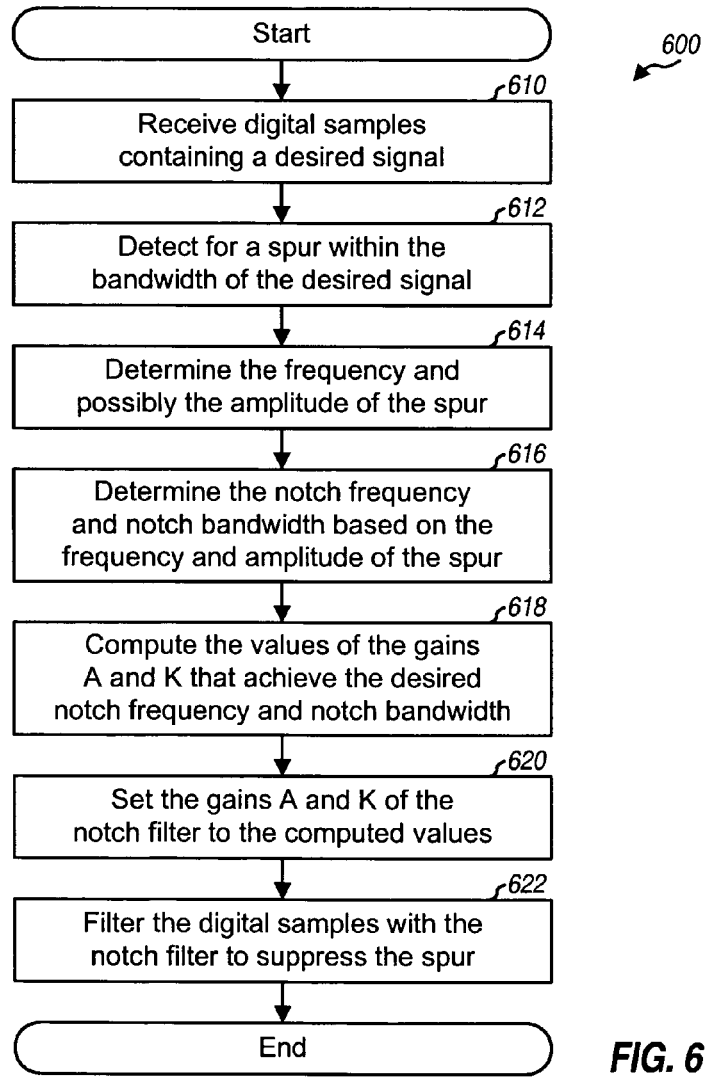
FIG. 6 shows a process for detecting and suppressing spur.

FIG. 6 shows an embodiment of a process 600 for performing spur detection and suppression. Digital samples containing a desired signal are initially received (block 610). A spur located within the bandwidth of the desired signal is detected for (block 612). The spur may be detected using an FFT-based scheme, a look-up table of known internally generated spurs, or some other detection scheme. The frequency and possibly the amplitude of the spur are determined (block 614). The notch frequency and notch bandwidth are then determined based on the frequency and amplitude, respectively, of the spur (block 616). The A and K gain values that achieve the desired notch frequency and bandwidth are computed, e.g., as shown in equations (11) through (14) (block 618). The gains A and K of the notch filter are then set to the computed values (block 620). The digital samples are filtered with the notch filter to suppress the spur (block 622).

For the embodiments described above, spur suppression is performed based on a notch filter having a variable notch frequency and a variable notch bandwidth. The notch filter may be viewed as a specific type of equalizer. An equalizer is typically implemented with a finite impulse response (FIR) filter and often operates based on a metric such as minimum inter-chip interference (ICI), minimum mean square error, and so on. The notch filter shown in FIGS. 3 and 5A is an equalizer that is implemented with an infinite impulse response (IIR) filter and that operates on a metric to suppress spur. An equalizer that can suppress spur may also be implemented with other filter structures and may operate based on other metrics. The spur suppression may also be performed based on other types of circuit, and this is within the scope of the invention. For example, a circuit may synthesize the spur and subtract the synthesized spur from the input samples.

The spur suppression techniques described herein may be implemented by various means. For example, these techniques may be implemented in hardware, firmware, software, or a combination thereof. For a hardware implementation, the processing units used to perform spur suppression may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a software implementation, the spur suppression techniques may be implemented with modules (e.g., procedures, functions, and so on) that perform the functions described herein. The software codes may be stored in a memory (e.g., memory 172 in FIG. 1) and executed by a processor (e.g., processor 170). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
 a processor operative to receive digital samples for a desired signal having a spur located within a bandwidth of the desired signal, to filter the digital samples with a notch filter to suppress the spur, wherein the notch filter includes a notch bandwidth having an adjustable width determined from an amplitude of the spur and set by shifting output samples, and to provide the output samples having the spur suppressed; and
 a memory operatively coupled to the processor.

2. The apparatus of claim 1, wherein the spur is generated internally within the apparatus.

3. The apparatus of claim 1, wherein the spur is a harmonic of a clock within the apparatus.

4. The apparatus of claim 1, wherein the spur is generated by an external interfering source and resides in an input radio frequency (RF) signal.

5. The apparatus of claim 1, wherein the processor is operative to filter the digital samples with a notch filter having an adjustable notch frequency.

6. The apparatus of claim 1, wherein the processor is operative to filter the digital samples with a notch filter having an adjustable notch frequency and an adjustable notch bandwidth.

7. The apparatus of claim 1, wherein the processor is operative to detect for the spur and to filter the digital samples based on characteristics of the spur.

8. The apparatus of claim 1, wherein the processor is operative to detect for the spur by performing a fast Fourier transform (FFT) or a discrete Fourier transform (DFT) on the digital samples.

9. The apparatus of claim 1, wherein the memory is operative to store a plurality of known spurs, and wherein the processor is operative to identify the spur as one of the plurality of known spurs.

10. The apparatus of claim 1, wherein the processor is operative to filter the digital samples with a notch filter having a complex gain and to perform a plurality of real multiplies to implement a complex multiply with the complex gain.

11. The apparatus of claim 10, wherein the processor is operative to form first and second coefficients based on the complex gain and to perform two smaller real multiplies with the first and second coefficients for each of the plurality of real multiplies.

12. The apparatus of claim 10, wherein the processor is operative to filter the digital samples with a notch filter having a real gain and to perform bit shifts to implement a real multiply with the real gain.

13. An apparatus comprising:
 a processor operative to receive digital samples for a wideband signal having a spur located within a bandwidth of the wideband signal, to filter the digital samples with a notch filter to suppress the spur, wherein the notch filter includes a notch bandwidth having an adjustable width determined from an amplitude of the spur and set by shifting output samples, and to provide the output samples having the spur suppressed, wherein the spur is generated internally at the apparatus; and
 a memory operatively coupled to the processor.

14. The apparatus of claim 13, wherein the wideband signal is a code division multiple access (CDMA) signal.

15. The apparatus of claim 13, wherein the wideband signal is an orthogonal frequency division multiplexing (OFDM) signal.

16. A wireless device comprising:
 a processor operative to receive digital samples for a code division multiple access (CDMA) signal having a spur located within a bandwidth of the CDMA signal, to filter the digital samples with a notch filter to suppress the spur, wherein the notch filter includes a notch bandwidth having an adjustable width determined from an amplitude of the spur and set by shifting output samples, and to provide the output samples having the spur suppressed, wherein the spur is generated internally within the wireless device; and
 a memory operatively coupled to the processor.

17. The wireless device of claim 16, wherein the processor is operative to filter the digital samples with an adjustable notch filter having an adjustable notch frequency.

18. The wireless device of claim 16, wherein the spur is a harmonic of a clock within the wireless device.

19. A method comprising:
 receiving digital samples for a desired signal having a spur located within a bandwidth of the desired signal;
 filtering the digital samples to suppress the spur, wherein the filtering the digital samples comprises filtering the digital samples with a notch filter including a notch bandwidth having an adjustable width determined from an amplitude of the spur and set by shifting output samples; and
 providing the output samples having the spur suppressed.

20. The method of claim 19, wherein the filtering the digital samples comprises filtering the digital samples with a notch filter having an adjustable notch frequency.

21. The method of claim 19, wherein the filtering the digital samples comprises
 detecting for the spur, and
 filtering the digital samples based on characteristics of the spur.

22. An apparatus comprising:
 means for receiving digital samples for a desired signal having a spur located within a bandwidth of the desired signal;
 means for filtering the digital samples to suppress the spur, wherein the filtering the digital samples comprises filtering the digital samples with a notch filter including a notch bandwidth having an adjustable width determined from an amplitude of the spur and set by shifting output samples; and
 means for providing the output samples having the spur suppressed.

23. The apparatus of claim 22, wherein the means for filtering the digital samples comprises means for filtering the digital samples with a notch filter having an adjustable notch frequency.

24. The apparatus of claim 22, wherein the means for filtering the digital samples comprises
 means for detecting for the spur, and
 means for filtering the digital samples based on characteristics of the spur.

* * * * *